United States Patent

[11] 3,621,115

| [72] | Inventor | Wilhelm K. Kolster, deceased<br>late of Michigan City, Ind. by Christel E. Kolster, executrix |
|---|---|---|
| [21] | Appl. No | 33,556 |
| [22] | Filed | May 1, 1970 |
| [45] | Patented | Nov. 16, 1971 |
| [73] | Assignee | Meridian Industries, Inc.<br>Southfield, Mich. |

[54] CONNECTOR BOX COVER CONSTRUCTION
7 Claims, 7 Drawing Figs.

| [52] | U.S. Cl. | 174/67,<br>220/24.3, 220/31 S |
|---|---|---|
| [51] | Int. Cl. | H05k 5/03 |
| [50] | Field of Search | 174/67;<br>220/3.8, 24.3, 31 S, 35 |

[56] References Cited
UNITED STATES PATENTS

| 3,063,549 | 11/1962 | Weichselbaum | 220/315 X |
| 3,127,048 | 3/1964 | Winter | 174/67 X |
| 3,140,344 | 7/1964 | Slater et al. | 174/67 |
| 3,189,212 | 6/1965 | Bellek | 174/67 X |
| 3,204,807 | 9/1965 | Ramsing | 174/67 X |
| 3,252,611 | 5/1966 | Weitzman et al. | 174/67 X |
| 3,458,113 | 7/1969 | Swartzbaugh | 220/31 S X |

*Primary Examiner*—Lewis H. Myers
*Assistant Examiner*—D. A. Tone
*Attorney*—Barnard, McGlynn & Reising

ABSTRACT: A one-piece, molded plastic connector box cover including a cover plate and closure cap with an integral hinge provided therebetween and an overcenter biasing means formed and provided between the plate and cap to keep the cap closed when disposed relatively over the cover plate part.

PATENTED NOV 16 1971　　3,621,115

INVENTOR.
BY Wilhelm K. Kolster,
DECEASED
EXECUTRIX Christel E. Kolster
BY Dale A. Winnie
ATTORNEY

CONNECTOR BOX COVER CONSTRUCTION

BACKGROUND OF THE INVENTION

The most commonly known types of covers for outdoor-type electrical connector boxes includes screw-on caps, with a connecting chain, and those with some biasing means to keep the cover member closed.

They are usually made weathertight, for protection against rain and moisture, which may cause a short circuit, and they are standard equipment on all military and other vehicles which require such connectors and where dirt, mud or other contaminants may be encountered or the connector box may be splashed or even submerged in water.

It is important with all such connector boxes that the connector cover be easy to open, in order to use the connector box, that its hinge or means of connection to the electrical service box be able to withstand repetitious and abusive use, that it, itself, be sturdy in construction to withstand misuse, and, if possible, that some means be provided to assure that the cover means will be closed, to provide the necessary cover protection, when not in use.

SUMMARY OF THE INVENTION

The present invention relates to a one-piece molded plastic cover plate and cap for electrical service connection boxes and the like.

The molded plastic part includes a cover plate that is fastened to a connector box and which has a cover cap formed with it and connected to it by a molded web that serves as a flexible hinge connection. There are no separate hinge parts to manufacture, handle, assemble or worry about as far as service and repair are concerned.

In addition, the cover plate is formed to include a part which serves as a leaf spring, with the necessary stiffness and required resilience, and it is positioned to cooperate with a part on the closure cap to provide snap-over biasing for the closure member.

The one-piece molded plastic cover plate and closure cap thus include, altogether, the hinge and spring means for assuring easy access and positive closure for an electrical service junction box, or the like, on which provided.

DETAILED DESCRIPTION OF THE ILLUSTRATED EMBODIMENT

Figure 1:
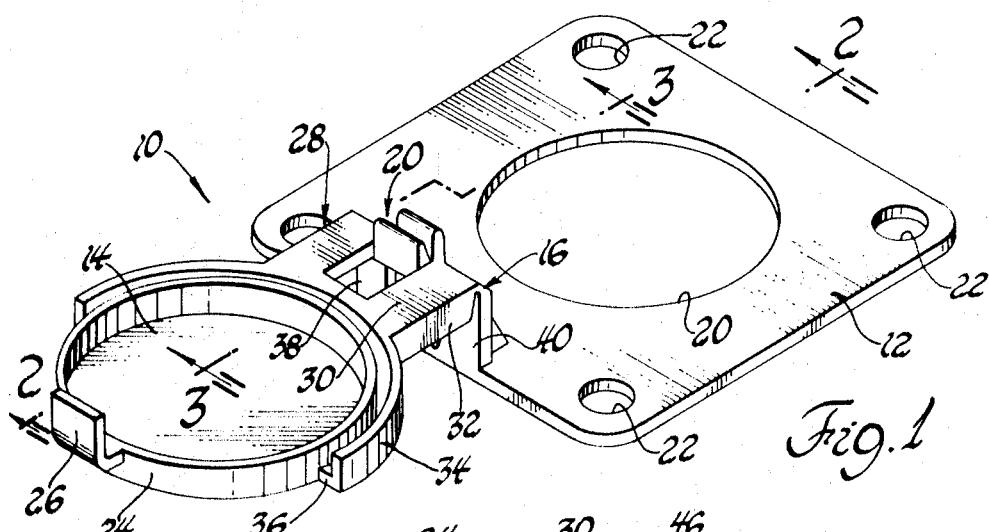
FIG. 1 is a perspective view of the connector cover of the present invention, as molded with the closure cap open.

The connector cover 10 is an integrally formed and molded one-piece member which includes a cover plate part 12, a closure cap member 14, a hinge connection 16, and biasing means 18, relatively incorporated in and with the hinge connection.

The cover plate 12 is of a size and shape to fit a connector box, not shown, and is formed to include a center opening 20 through which an electrical connection, in the connector box, is intended to extend through. Screw holes 22 at each corner of the plate are for screws to hold the cover plate to the connector box, as is conventionally known and understood.

The closure cap 14 is circular in shape, in this particular instance, and includes an annular flange 24 and a finger tab 26. It also includes a supporting arm 28 with a hinge-connected part 30 strengthened by flanges 32 along its side edges. A semicircular arm extension 34, which is angular in cross section for strengthening purposes, is provided on the other end of the supporting arm and in trunnion engagement, as at 36, with the actual cover cap.

The actual hinge connection 16 includes a pair of hinge supports 38 and 40 which are molded from and stand up at one side edge of the cover plate 12. They are dimensioned to assure the required strength and stability and each have a gusset 42 for further assurance in such regard.

Between the hinge supports 38 and 40 and the hinge-connected part 30 of the cover cap arm 28, there are provided thin-walled web sections 44 and 46 which actually serve as the hinge joint connection for the connector cover assembly of this invention.

The materials from which the connector cover assembly may be made vary greatly but preferably include those with inherent resilience sufficient to provide repeated hinge joint movement without wear or deterioration. Plastic materials found suitable for such use include polyethylene, polypropylene, polyethylene terephthalate, all of which are polyalkylene materials, and the conventional polyester and polyvinyl materials. There are also a wide variety of elastomeric materials which provide good insulation for electrical connectors in addition to providing good protection against contamination. These include, but are not limited to, polyisoprene, neoprene, polyvinylchloride, polybutadiene, isobutylene and polyurethane elastomers, which have also proven capable of use in casting or molding integral parts as in the present invention.

The hinge connected end of the cover cap supporting arm 28 is chamfered, as at 48, to avoid interference when the closure cap is in the open position, as shown in FIG. 1. The hinge supports 38 and 40 will also be noticed as chamfered, at 50, on the other side to avoid interference and to provide a reduction in the cross-sectional area to obtain the web section hinge parts desired.

The biasing means 18 is provided between the two hinge supports 38 and 40. It includes a leaf spring part 52 molded from the cover plate with the hinge supports and disposed relatively between them. It has no strengthening ribs and is intended to be flexed as shown sequentially in FIGS. 3–6.

An interference part 54 is molded on the cover cap arm 28 and forms a part of the biasing means 18. It is disposed between the web sectioned hinges 44 and 46 for interference engagement with the leaf spring part 52.

Figure 6:
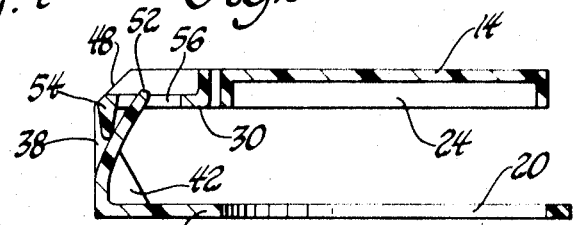
FIG. 6 is similar to FIGS. 3–5, but showing full views of the closure cap and cover plate, and with the closure cap disposed in the closing position over the cover plate.
Figure 7:
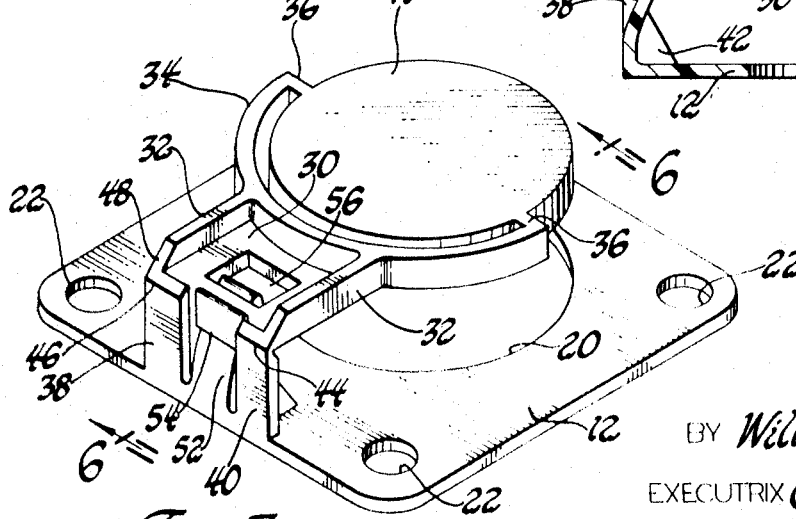
FIG. 7 is a perspective view of the connector cover of the present invention with the closure cap in the closing position over the cover plate.

An opening 56 in the cover cap supporting arm is provided to receive the end of the leaf spring 52 therewithin when the closure cap 14 is disposed relatively over the cover plate 12 as is shown in FIG. 6.

Figure 2:
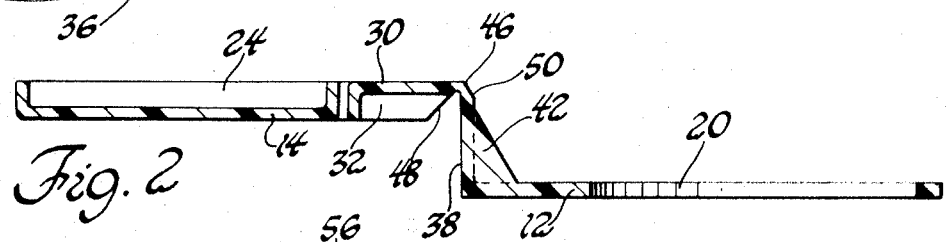
FIG. 2 is a cross-sectional view taken in the offset plane of line 2—2, which passes through the closure cap hinge and the centerline of the cover plate.

The connector cover 10, including all of the structure mentioned, is molded relatively flat and in the form shown by FIGS. 1 and 2; that is, with the closure cap in the open position and extending relatively away from the hinge connected side edge of the cover plate.

Figure 3:
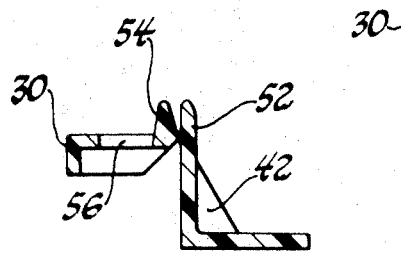
FIG. 3 is a cross-sectional view of the hinge connection as seen in the plane of line 3—3 in FIG. 1, through the biasing means and with just the cap supporting arm and part of the cover plate shown.
Figure 4:
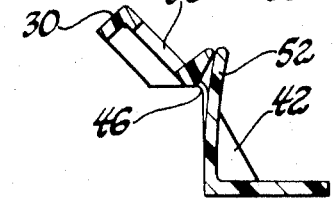
FIG. 4 is similar to FIG. 3 with the hinge connected arm shown in an intermediate position.
Figure 5:
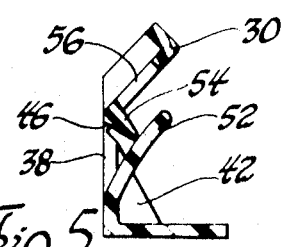
FIG. 5 is similar to FIGS. 3 and 4 with the hinge connected arm shown in a still different position.

In the open position shown in the first two drawing FIGS., the flat leaf spring plastic part 52 extends upright as best shown in FIG. 3. When the closure cap is moved to cover the opening 20 in the cover plate, the interference part 54 is caused to come into engagement with the leaf spring part 52, as is shown in FIG. 4. As it is swung further over, the interference part passes through the position shown in FIG. 5 to that shown in FIG. 6 and wherein the leaf spring part 52 acts to bias the closure cap 14 into the closed position.

The trunnion supports 36 for the actual cover cap on the supporting arm enable some relative adjustment of the closure cap to better fit an electrical connection extending through the cover plate opening 20.

From the foregoing, it will be appreciated that the closure cap 14 is normally biased to a closed position but that it is easy to flip open for access to the electrical connection which it protects. As long as an effort is made to close the cover cap, sufficient to carry it past the overcenter position, the biasing force will take effect and complete the job.

I claim:

1. A connector cover, comprising;
   a cover plate including an opening and a closure cap for closing the opening,
   a hinge connection formed integrally with and between said cover plate and closure cap, and
   means cooperatively formed from and between said cover plate and closure cap with said hinge connection for selectively biasing said closure cap in relatively open and closed position.

2. The connector cover of claim 1,
   said cover plate, closure cap, hinge connection and biasing means all being of the same organic polymeric.

3. The connector cover of claim 2,
   said hinge connection including separate thin walled web sections interconnecting said cover plate and closure cap and having said biasing means disposed therebetween.

4. The connector cover of claim 3,
   said biasing means including a leaf spring part formed from said cover plate and extending with a part of said closure cap between said hinge providing web sections.

5. The connector cover of claim 4,
   said closure cap having an interference part formed and provided between said web sections for engagement with said leaf spring part in intermediate position between the fully open and closed positions thereof.

6. The connector cover of claim 1,
   said closure cap including an arm member hinge connected to the cover plate and having the arm member hinge connected in turn to said closure cap.

7. A connector cover, comprising;
   a relatively flat-molded integrally formed structure including a cover plate and a closure cap with a hinge connection formed and provided therebetween,
   said cover plate having an opening provided therein which is made accessible and unaccessible by said closure cap and including a leaf spring part for overcenter biasing actuation of said closure cap into such positions,
   said closure cap including an arm extension having trunionlike engagement and an interference part for engagement with said leaf spring part in the overcenter positioning thereof, and
   said hinge connection including coaxially disposed separate thin walled web sections interconnecting said cover plate and closure cap arm extension and having said leaf spring and interference parts disposed relatively therebetween.

* * * * *